United States Patent
Price et al.

(10) Patent No.: US 6,711,933 B2
(45) Date of Patent: Mar. 30, 2004

(54) SYSTEM AND METHOD FOR ODOMETER AUTOCALIBRATION

(75) Inventors: Steven Paul Price, Cedar Rapids, IA (US); Todd Alan Biegler, Marion, IA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 194 days.

(21) Appl. No.: 10/093,672

(22) Filed: Mar. 8, 2002

(65) Prior Publication Data

US 2002/0124628 A1 Sep. 12, 2002

Related U.S. Application Data

(60) Provisional application No. 60/274,272, filed on Mar. 8, 2001.

(51) Int. Cl.[7] .................................................. G06G 7/78
(52) U.S. Cl. ...................................................... 73/1.37
(58) Field of Search ................................ 73/1.37, 1.79; 702/96, 97; 700/304

(56) References Cited

U.S. PATENT DOCUMENTS

| | | |
|---|---|---|
| 5,156,038 A | 10/1992 | Kozikaro |
| 5,402,365 A | 3/1995 | Kozikaro et al. |
| 6,029,496 A | 2/2000 | Kreft |
| 6,088,650 A * | 7/2000 | Schipper et al. ............ 342/457 |

\* cited by examiner

*Primary Examiner*—Robert Raevis

(57) ABSTRACT

A system and method of calibrating a vehicle odometer (12) includes a controller (18) receiving signals from the odometer (12) indicative of movement of the vehicle (10) and a receiver (26) indicative of distance traveled. The controller (18) obtains information indicative of movement of the vehicle (10) in response to travel at a constant speed. The receiver (26) provides signals indicative of the distance traveled to the controller (18). The controller (18) determines an average number of signals relative to distance and compares the average number to a current number of signals relative to distance. Odometer calibration updates if the average and current number of signals relative to distance differs by a predetermined amount. The number of signals relative to the distance is only recorded when the vehicle (10) is traveling at a constant speed, eliminating aberrant data from odometer calibration.

15 Claims, 2 Drawing Sheets

SYSTEM AND METHOD FOR ODOMETER AUTOCALIBRATION

This application claims priority to provisional application Ser. No. 60/274,272 filed Mar. 8, 2001.

BACKGROUND OF THE INVENTION

This invention relates to a system and method for calibrating a vehicle odometer, and specifically to a system and method for automatically calibrating an odometer.

Typically, an odometer of a vehicle senses the distance traveled by the vehicle to record mileage and determine vehicle speed. Public transportation vehicles record and track mileage for budget purposes and to evaluate driver performance. Mileage information is also used to coordinate and initiate arrival and departure announcements. If the distance traveled is not accurately measured, announcements may be timed improperly, and resources may be improperly allocated.

Typically, a conventional odometer includes a series of gears connected by a rotating cable to a rotating mechanism of the vehicle such as a tire, transmission or engine component. The cable in turn rotates a series of gears correlated to relate rotation of the cable to distance traveled by the vehicle. A known improvement over mechanical linkage includes an electronic sensor that emits a number of pulses for each rotation of a wheel, engine or transmission component. The pulses obtained from the sensor are calibrated to represent a known distance. Calibration of the odometer relates the number of pulses to distance in which the vehicle has traveled within a predetermined tolerance.

A known calibration method includes driving the vehicle along a preset path of a known distance and recording the number of pulses relative to that known distance. Variations in vehicle speed and the path driven create inaccuracies to the calibration. Re-calibration is required whenever maintenance is performed on the vehicle to assure accuracy of the odometer.

Many factors can change the calibration of an odometer. Factors that effect the calibration of the odometer include vehicle weight; tire pressure, and environmental conditions. In addition, when the tires of a vehicle are changed, the characteristics of the vehicle change requiring a new calibration to assure accuracy.

A known calibration method improvement includes the use of signals generated from a global positioning satellite to determine the distance traveled of the vehicle. A global positioning receiver disposed within the vehicle receives signals from the global positioning satellite that are used to determine the precise distance in which the vehicle has traveled. The precise distance in which the vehicle has traveled is then used with corresponding pulse data received from sensors onboard the vehicle. The sensors onboard the vehicle record pulses indicative of movement of the vehicle.

However, the vehicle must be traveling at a constant speed to provide an accurate determination of the number of pulses received relative to the distance traveled. It is known to apply statistical methods to account for the inaccuracies caused by variations in speed during calibration. However, such methods are complex and memory intensive. Further, such statistical methods only reduce the magnitude of inaccuracies caused by variations in speed.

Accordingly, it is desirable to develop a system and method for accurately calibrating an odometer by eliminating the use of aberrant data caused by vehicle speed variations.

SUMMARY OF THE INVENTION

An embodiment of this invention is a system and method for automatically calibrating a vehicle odometer by collecting vehicle speed data for odometer calibration only when the vehicle is traveling at a constant speed.

The system includes a sensor transmitting a series of pulses indicative of movement of the vehicle to a vehicle controller. The vehicle controller also receives signals indicative of a distance traveled of the vehicle from a receiver. The receiver receives signals emitted from a global positioning satellite indicative of current vehicle position. Receiving several signals of the current instantaneous position of the vehicle allows the determination of the distance traveled by the vehicle. The controller records a number of samples comprising a number of pulses relative to distance traveled. Combining several of the recorded samples provides an average number of pulses relative to distance value. The current calibration of the odometer is reflected in a current number of pulses relative to distance value. The current value is compared to the average value and the odometer calibration is changed to reflect the average value in response to the difference between the two values being greater than a predetermined tolerance.

The method of calibrating an odometer includes the steps of collecting a number of pulses indicative of movement of the vehicle. If the vehicle is above a predetermined minimum speed, a comparison is made between incoming pulses that indicate movement or speed of the vehicle. The comparison of incoming pulses determines if the vehicle is traveling at a constant speed. If the vehicle is traveling at a constant speed, the controller records the number of pulses relative to a distance traveled as a sample. The controller gathers sample data in this manner until recording a sufficient number of samples. The average number of pulses relative to distance value represents a number of pulses relative to distance traveled for current operating conditions of the vehicle. The average and current number of pulses relative to distance are compared, and if there is a sufficient difference, the calibration of the odometer is updated accordingly.

Calibration of the odometer can change for many different reasons including environmental conditions, tire pressure increase or decrease, change of tire size, additional A vehicle load, and any number of considerations that can combine to change the operating characteristics of the vehicle. For this reason, data samples are continually gathered and compared to the current calibration of the odometer. By continuously operating to update the calibration value of the odometer, the accuracy of the odometer reading can be ensured for a vehicle throughout operation.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
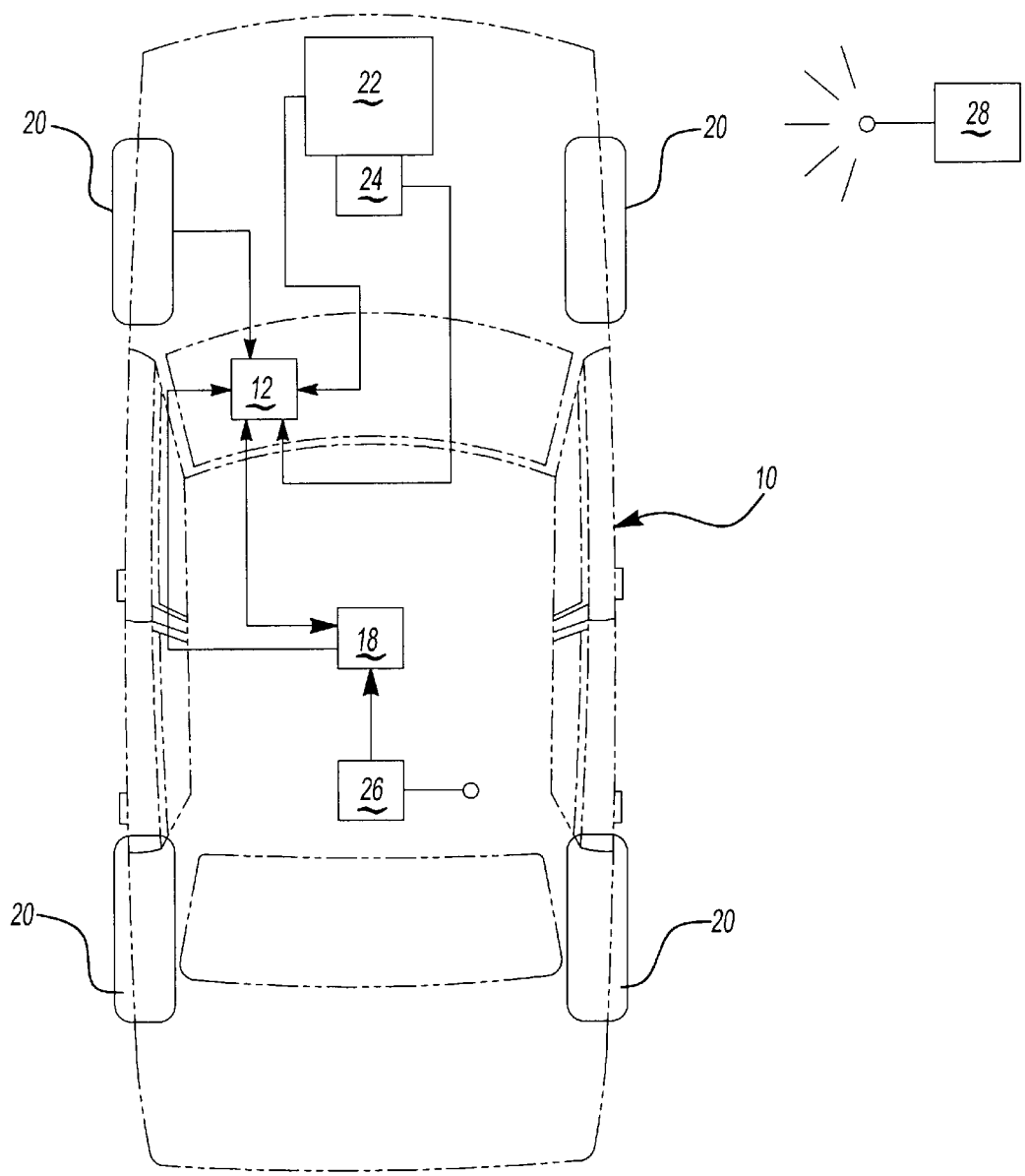
FIG. 1 is a schematic view of a vehicle including the system for odometer auto calibration.

Referring to the FIG. 1, a vehicle 10 schematically illustrated, includes an odometer 12 that provides a number of pulses indicative of movement of the vehicle 10. The odometer 12 receives data from various systems or assemblies on the vehicle 10 such as the engine 22, transmission 24, and tires 20. The pulses emitted from the odometer 12 indicate motion of the vehicle 10. The odometer 12 transmits the pulses to a controller 18. The controller 18 also receives data from a receiver 26. The receiver 26 preferably receives signals indicative of current vehicle 10 position from global positioning satellites 28. Signals indicative of vehicle position may also be obtained from other sources that are known to a worker skilled in the art. A number of vehicle position signals are used by the controller 18 to determine a known distance traveled.

The controller 18 combines the number of pulses from the odometer 12 with the known distance traveled to provide a calibration value for the odometer 12. The calibration value represents the number of pulses emitted over a known distance. Preferably, the distance is a half-mile such that the calibration value represents pulses per half mile (PPHM). The PPHM value represents the number of pulses the odometer 12 will emit after the vehicle 10 travels one half mile. The PPHM value combined with a timer is used to indicate speed of the vehicle 10.

The actual number of PPHM varies in response to physical changes in the vehicle 10. When the actual number of PPHM is different from the PPHM value used to calibrate the odometer 12, mileage and speed values will be inaccurate. Physical changes in the vehicle 10 include changes in tire pressure, change in vehicle load, change of tires installed on the vehicle, or other environmental conditions that change operating characteristics of the vehicle 10 as understood by a worker skilled in the art.

The controller 18 records the number of pulses received relative to the distance traveled as a data sample. Each data sample will include a value that represents the number of pulses recorded per half mile. Although, preferably PPHM comprise a single data sample, it is within the contemplation of this invention to use distances other than a half-mile. Once a minimum number of samples are obtained, an average PPHM value is determined from the gathered data samples. The average PPHM value is compared to a current PPHM value used as the current calibration value by the odometer 12. Preferably, the current PPHM value represents an average value of the last 200 data samples. The number of data samples comprising the PPHM value is preferably 200, however it is within the contemplation of this invention to determined the current PPHM value with differing quantities of data samples. If the current PPHM value differs from the average PPHM value, then the calibration value is updated to reflect the average PPHM value.

A PPHM value is recorded only when a comparison of incoming pulses indicates that the vehicle 10 is traveling at a constant speed. Variation of vehicle speed causes inaccurate PPHM data samples. Inaccurate PPHM data samples cause correlating inaccuracies in the calibration of the odometer and are therefore eliminated by only recording PPHM samples when the speed of the vehicle is constant. Consistent speed of the vehicle is determined by examining the number of pulses comprising a PPHM sample with a prior obtained PPHM sample. The data sample indicates a relatively constant speed if values of incoming PPHM samples differ by less than a predetermined tolerance. The tolerance range is a specific percentage of the previous PPHM value and is applications specific. In some applications, a difference of 10% maybe sufficient to indicate a relatively constant vehicle speed. Further, other application may require only a 5% difference between values to signify that the vehicle is traveling at a relatively constant speed. Preferably the criteria for determining a constant speed is a variation of less than 1% from a prior gathered data sample, it is within the contemplation of this invention to use other criteria or other percentages to determine that the vehicle is traveling at a consistent and constant speed.

To further assure accuracy of calibration data, PPHM values are only recorded if the vehicle 10 is traveling at a speed greater than a minimum speed of 15 miles an hour. The minimum speed requirement is determined to optimize accuracy of distance calculation based on the signals received from the global positioning satellite 28. Preferably, data samples are gathered only when the vehicle 10 is traveling at a speed above 15 miles an hour. However, it is within the contemplation of this invention that other minimum speeds higher or lower maybe used to provide optimal distance calculation to qualify the gathering of sample data indicative of PPHM. For example in some application a minimum speed of 10 miles an hour may be sufficient to provide accurate data, wherein another application may require a vehicle to travel at a speed greater than 20 miles an hour to provide accurate data.

Figure 2:
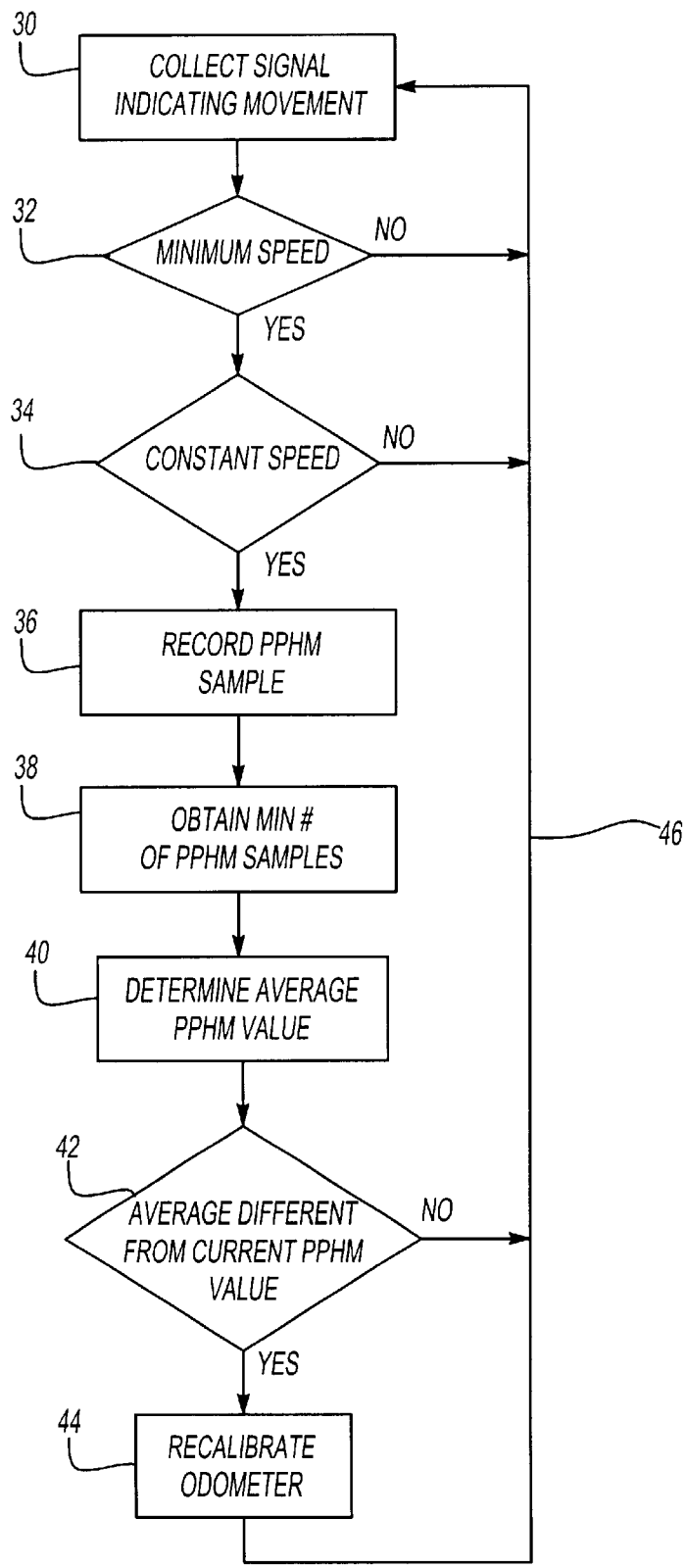
FIG. 2 is a flowchart illustrating the steps of a method for odometer auto calibration.

FIG. 2 is a flow chart of the method of auto calibration of the odometer 12. The initial step, indicated at 30, includes collecting a number of pulses indicative of movement of the vehicle. The collection of pulses comprises the sub-step, indicated at 32, of determining that the vehicle 10 is traveling at the minimum speed. Preferably, the minimum speed is 15 miles an hour. If the vehicle 10 is traveling above the minimum speed, the data sampled is evaluated to determine if the vehicle 10 is traveling at a relatively constant speed.

The determination of a relatively constant vehicle speed, indicated at 34, includes the step of comparing received pulses for a variation of less than a predetermined percentage. A first received PPHM data sample is compared against a second PPHM. If the vehicle 10 is moving at a constant speed, the difference between the first and second received values will be less than predetermined percentage. The predetermined percentage is a value selected that corresponds to a relatively constant vehicle speed. The specific percentage is application specific. In some applications, a difference of 10% may be sufficient to indicate a relatively constant vehicle speed. Further, other application may require only a 5% difference between values to signify that the vehicle is traveling at a relatively constant speed. Preferably, a difference of less than 1% is used to signify that the vehicle 10 is traveling at a relatively constant speed.

The PPHM sample is then recorded as indicated at 36. The PPHM value is gathered and compared approximately every 1.2 seconds during operation of the vehicle 10. The specific interval in which data is gathered may be of any duration calculated to provide a significant difference between data points to allow the determination that the vehicle 10 is traveling at a constant rate of speed.

The PPHM is recorded, as indicated at 36, once it has been determined that the vehicle 10 is traveling above a minimum required speed 34 and that the vehicle 10 is traveling at a relatively constant speed 34. The controller 18 collects a minimum number of samples, indicated at 38, in order to calculate the average PPHM value. Preferably the minimum number of samples is five, however, other quantities of data may be used to determined the average PPHM value. Each sample is collected at a constant speed, even though the speed may be different for each data sample. Because each sample is collected at constant speed, inaccurate and aberrant data caused by variations in speed are eliminated from the odometer 12 calibration.

The controller 18 will then compare the average PPHM with a current PPHM, as indicated at 42. The current PPHM reflects the current calibration of the odometer 12. If the average PPHM differs from the current PPHM by an amount greater than a predetermined tolerance, the calibration of the odometer 12 is updated to the average PPHM value, as indicated at 44. The tolerance value may be any value determined to signify a deviation from the current PPHM value. Tolerance values are application specific. A tolerance value of 1% maybe sufficient for some applications. Preferably, the tolerance is a value determined to be 0.125% of the current PPHM. The current PPHM consists of a larger number of sample points that have been recorded previous to the number of sample points used to determine the average PPHM. Preferably, the number of sample points recorded to determine the current PPHM is 200.

PPHM data samples are continuously gathered as indicated at 46 such that the calibration value of the odometer 12 reflects current operating conditions of the vehicle 10. Further, by recording only PPHM values obtained when the vehicle 10 is traveling at a constant speed, the inaccuracies caused by aberrant data are eliminated.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A method of calibrating a vehicle odometer comprising the steps of;
    a. receiving a signal indicative of distance traveled;
    b. receiving a signal indicative of vehicle movement;
    c. determining that the vehicle is traveling at a relatively constant speed in response to receiving a number of signals within a tolerance range;
    d. determining an average number of signals relative to a distance in response to a determination made under step c; and
    e. calibrating the odometer to reflect the average number of signals relative to the distance.

2. The method of claim 1, further including the step of comparing the average number of signals relative to the distance with a current number of signals relative to the distance, and calibrating the odometer in response to a difference between the average and current number of signals relative to distance being greater than a predetermined tolerance.

3. The method of claim 1, wherein said comparing step is further defined as comparing the average and current number of signals relative to distance in response to the vehicle speed being greater than a desired speed.

4. The method of claim 1, further including the step of recording a sample in response to the vehicle traveling at a constant speed.

5. The method of claim 4, wherein in step d is further defined as determining the average number of signals relative to the distance in response to recording a predetermined number of the samples.

6. The method of claim 1, wherein step a is further defined as receiving at least two signals indicative of differing vehicle position, and comparing the two signals indicative of differing vehicle position to determined distance traveled.

7. The method of claim 6, wherein said signal indicative of vehicle position originates from a global positioning system.

8. The method of claim 1, wherein step b. is further defined as receiving a number of pulse indicative of a movement of the vehicle from a sensor disposed within the vehicle.

9. A system for calibrating an odometer of a vehicle comprising;
    a sensor emitting a number of pulses indicative of movement of the vehicle,
    a receiver receiving signals indicative of vehicle position;
    a controller in communication with said sensor and said receiver, said controller determining a distance traveled from said signals indicative of vehicle position, and an average number of pulses relative to said distance traveled in response to a determination that the vehicle is traveling at a relatively constant speed.

10. The system of claim 9, wherein said controller compares said average number of pulses relative to said distance traveled to a current number of pulses relative to said distance traveled and initiates recalibration of the odometer in response to a difference between said average and current number of pulses relative to distance being greater than a predetermined tolerance.

11. The system of claim 10, wherein said controller records a number of pulses relative said distance as a signal sample in response to the vehicle traveling at a constant speed, and determines said average number pulses relative to distance in response to recording a predetermined minimum number of said samples.

12. The system of claim 11, wherein said controller records said sample in response to the vehicle speed being above a predetermined minimum.

13. The system of claim 9, wherein said signals indicative of vehicle position emanate from global positioning satellites.

14. The system of claim 9, wherein said sensor is an odometer.

15. The system of claim 9, wherein said sensor measures rotation of tires of the vehicle.

* * * * *